United States Patent
Barlerin et al.

(10) Patent No.: US 7,955,000 B2
(45) Date of Patent: Jun. 7, 2011

(54) JOINT ASSEMBLY, PARTICULARLY FOR BOGIE BRAKE LINKAGES

(75) Inventors: Jean-Claude Barlerin, Saint-Just-Saint-Rambert (FR); Eric Chaduiron, Viricelles (FR)

(73) Assignee: H.E.F., Andrezieux Boutheon (FR)

( * ) Notice: Subject to any disclaimer, the term of this patent is extended or adjusted under 35 U.S.C. 154(b) by 559 days.

(21) Appl. No.: 11/816,695

(22) PCT Filed: Feb. 20, 2006

(86) PCT No.: PCT/FR2006/050147
§ 371 (c)(1), (2), (4) Date: Aug. 20, 2007

(87) PCT Pub. No.: WO2006/087499
PCT Pub. Date: Aug. 24, 2006

(65) Prior Publication Data
US 2008/0159672 A1  Jul. 3, 2008

(30) Foreign Application Priority Data
Feb. 21, 2005  (FR) ...................... 05 50475

(51) Int. Cl.
*F16C 33/02* (2006.01)
(52) U.S. Cl. .................. 384/276; 384/292; 384/625
(58) Field of Classification Search .......... 384/276–293, 384/625; 29/898.04, 898.054–898.059
See application file for complete search history.

(56) References Cited

U.S. PATENT DOCUMENTS

| | | | |
|---|---|---|---|
| 4,120,544 A | | 10/1978 | Huber |
| 4,558,960 A | | 12/1985 | Lehtinen et al. |
| 4,620,803 A | | 11/1986 | Vezirian |
| 5,683,183 A | | 11/1997 | Tanaka et al. |
| 6,220,758 B1 | * | 4/2001 | Ono et al. ............ 384/286 |
| 6,589,412 B1 | | 7/2003 | Ogawa et al. |
| 2001/0048780 A1 | * | 12/2001 | Markovitch .......... 384/291 |
| 2003/0190101 A1 | * | 10/2003 | Horng et al. .......... 384/278 |
| 2006/0083452 A1 | * | 4/2006 | Hong et al. ........... 384/292 |

FOREIGN PATENT DOCUMENTS
EP  1 092 886  4/2001

OTHER PUBLICATIONS
International Search Report; PCT/FR2006/050147; Jul. 17, 2006.

* cited by examiner

*Primary Examiner* — Thomas R Hannon
(74) *Attorney, Agent, or Firm* — Heslin Rothenberg Farley & Mesiti P.C.

(57) ABSTRACT

A greased joint assembly operating in oily conditions comprises an axle mounted rotating or pivoting in a ring. The axle and/or the ring are subjected to a hardening surface treatment by diffusion or by structural transformation followed by a finishing surface treatment and a treatment suitable for reducing the tendency to jamming and for reducing the sensitivity to corrosion, and the bore of the ring and/or the axle is provided with arrangements acting as a lubricant reserve.

17 Claims, 3 Drawing Sheets

JOINT ASSEMBLY, PARTICULARLY FOR BOGIE BRAKE LINKAGES

The invention relates to the technical field of transport systems, particularly railways, and more particularly joints of brake linkages for railway rolling stock, such as bogies, particularly block brake linkages or disk brake linkages.

For this type of joint, according to the prior art, the railway field uses plain bearings in the form of case hardened steel rings cooperating with axles themselves made from case hardened steel. Lubrication is carried out only on assembly. It has in fact appeared that, after several months of operation, these joints exhibit lock-up problems due to jamming or corrosion, causing losses of braking efficiency. This may also result in asymmetric wear of certain components of the brake assembly, for example at the friction pads.

Thus it has been observed that after 800,000 kilometers, the joints of the bogie brake linkages of a TGV® trainset display lock-up problems due to corrosion and jamming.

It is the object of the invention to remedy these drawbacks in a simple, safe, effective and efficient manner.

The problem that the invention proposes to solve is to significantly overcome the jamming and corrosion of a joint assembly, operating in oily lubrication conditions, in the sense that the said joints operate exclusively under high loads with pivoting low speed pivoting movements, and are previously greased.

The joint assembly is of the type comprising, in a manner known per se, an axle mounted rotating in a ring. An advantageous application concerns the technical field of railways, particularly of bogie brake linkages.

To solve this technical problem, according to one basic feature of the invention, the axle and/or the ring are subjected to a hardening surface treatment by diffusion or by structural transformation followed by a finishing surface treatment and a treatment suitable for reducing the tendency to jamming and for reducing the sensitivity to corrosion, the bore of the said ring and/or the axle having arrangements for acting as a lubricant reserve.

It should be noted that this type of joint is perfectly known to a person skilled in the art in other fields of application. However, a person skilled in the art is not inclined to use this type of ring, which are designed to be regreased at regular intervals, whereas, in a railway application, the specification imposes a single lubrication at the time of assembly.

The results obtained are surprising because comparative, confidentially conducted tests, have demonstrated that the bogie brake linkages of TGV® trainsets equipped with a joint assembly according to the features of the invention, have served to travel 1,300,000 kilometers, without any trace of micro-jamming or of corrosion.

Using this basic design of the joint assembly, various embodiments may be considered, particularly for the arrangements for acting as a lubricant reserve. Thus, these arrangements may consist of holes, cavities, grooves forming a grid or chevrons.

Advantageously and in a non-limiting manner, these arrangements for acting as lubricant reserves are placed between channels formed at each of the ends of the bore of the ring. In this case, when the arrangements consist of grooves, the latter communicate with at least one of the channels.

As a preferable but non-limiting embodiment, the invention is described in greater detail below in conjunction with the figures appended hereto in which.

The joint assembly of the invention comprises a ring (1) and an axle (2). As indicated, this joint assembly has a particularly advantageous application in the railway field, particularly for bogie brake linkages.

Figure 2:
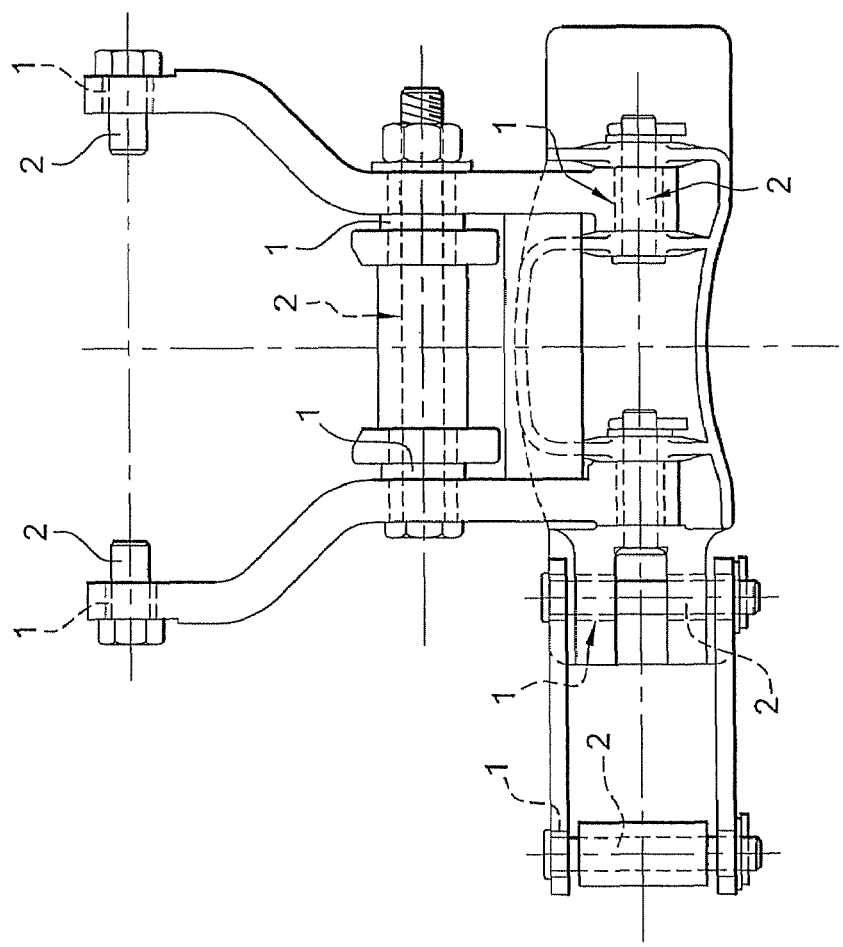
FIG. 2 is a side view corresponding to FIG. 1.
Figure 1:
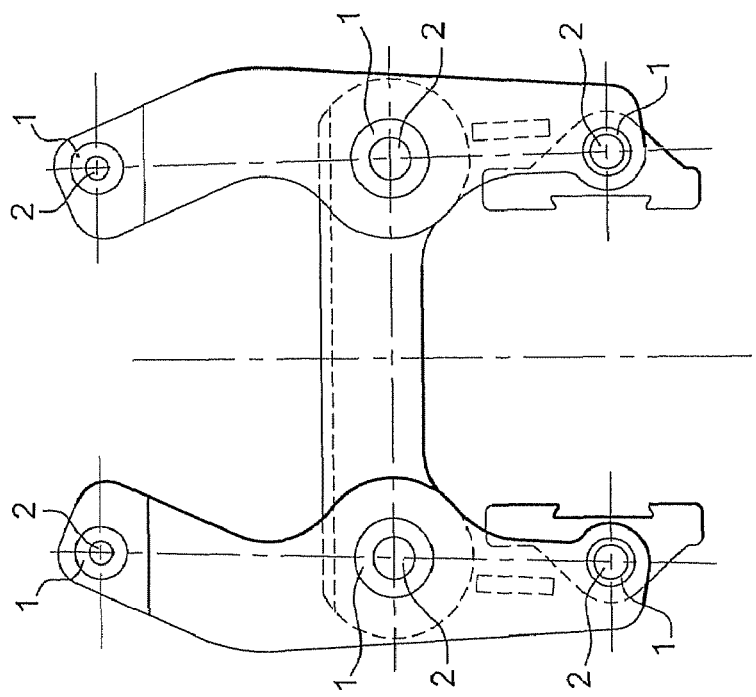
FIG. 1 shows an exemplary embodiment of the joint assembly according to the invention, applied to a bogie brake assembly, particularly for disk brakes.
Figure 3:
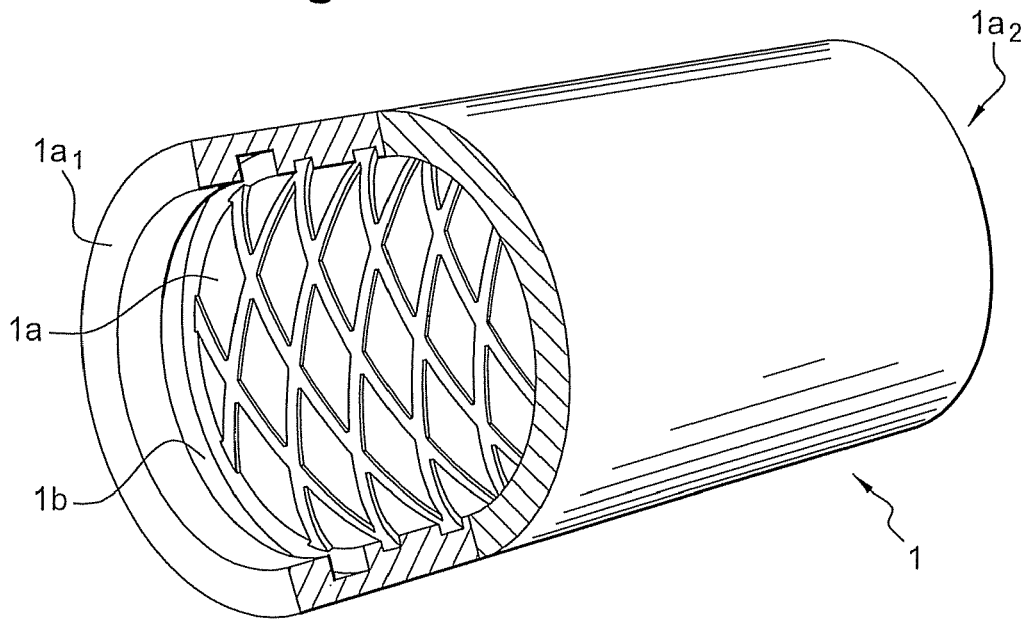
FIG. 3 is a perspective view, with partial cross section, of one embodiment of the joint ring of the invention.
Figure 4:
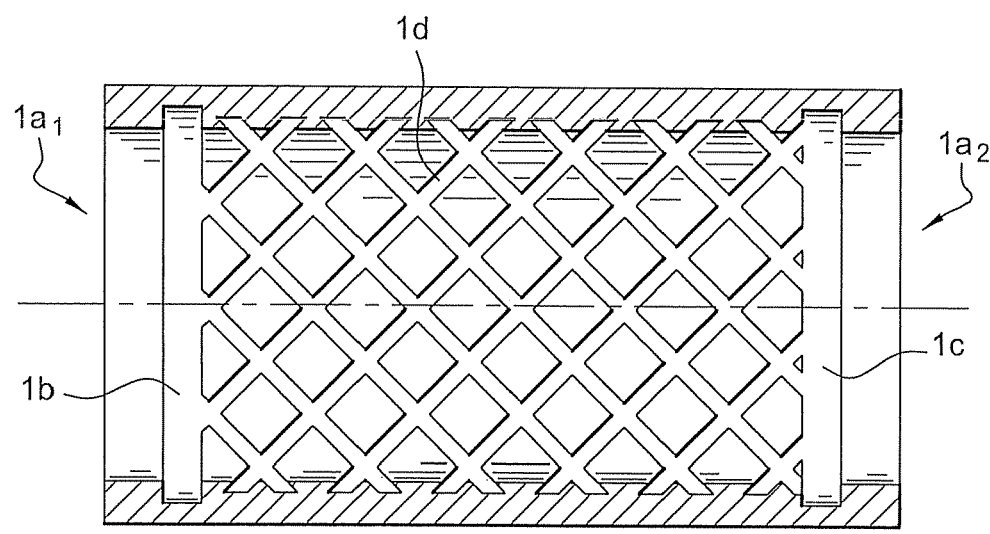
FIG. 4 is a longitudinal cross section of the ring.
Figure 5:
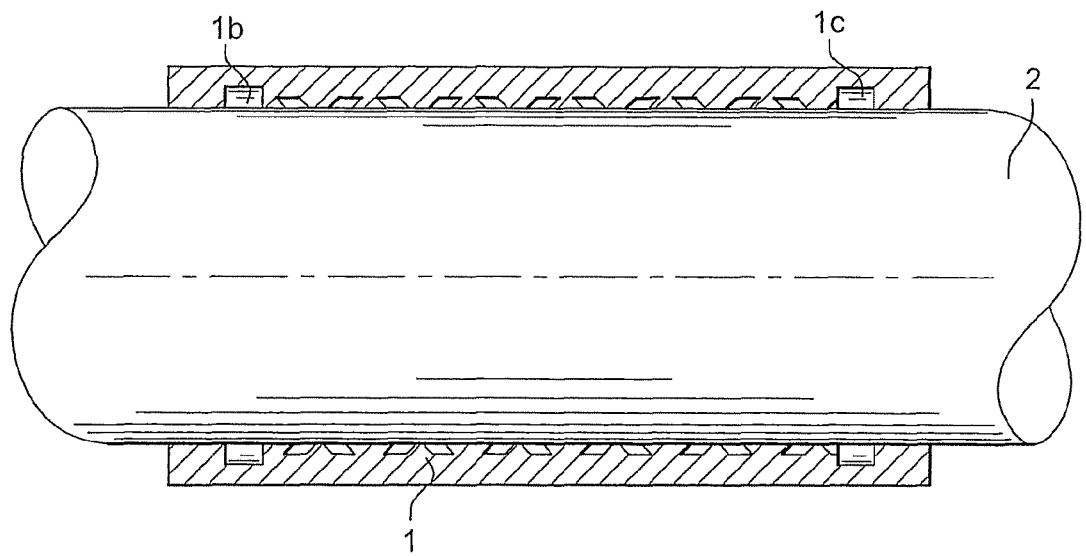
FIG. 5 is a view corresponding to FIG. 4, after assembly of the axle.

In the example shown in FIGS. 1 and 2, the brake linkage comprises several joint assemblies comprising a ring (1) and an axle (2).

According to the invention, the ring (1) and/or the axle (2) are subjected to a hardening treatment by diffusion, followed by a finishing treatment and a treatment suitable for reducing the tendency to jamming and for reducing the sensitivity to corrosion.

For example, the diffusion hardening treatment is selected from nitriding, nitrocarburizing, carbonitriding, case hardening.

The finishing treatment is, for example, a surface oxidation or phosphatation reaction, which may be followed by a coat of polymer optionally containing a solid lubricant particularly graphite, molybdenum bisulphide or PTFE. It should also be noted that the finishing treatment may be followed by a soluble or whole oil impregnation.

According to the invention, in combination with these various treatments, the bore (1a) of the ring (1) and/or the axle (2) has arrangements for acting as a grease reserve.

Various technical solutions may be considered. For example, and in a non-limiting manner, these arrangements consist of holes or cavities formed in the thickness of the ring at the level of the bore (1a). As an alternative, these arrangements consist of grooves (1d) suitably oriented to form a grid (figures of the drawings) or chevrons, joined or not at their apex.

Advantageously and in a non-limiting manner, these arrangements, regardless of their embodiment, are placed at least between channels (1b) and (1c) formed at each of the ends (1a1) and (1a2) of the bore (1a) of the ring (1).

In the case of grooves (1d), the said grooves communicate with at least one of the channels (1b) or (1c).

The channels (1b) and (1c) are conformed to prevent the grease from leaving the friction surface.

In a non-limiting manner, the depth of the channels (1b) and (1c) may be between 0.3 and about 3 mm. More generally, the depth of the channels (1b) and (1c) is, at most, equal to substantially one-third of the thickness of the body (1).

Figure 6:
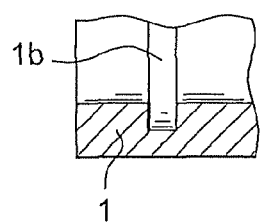
FIGS. 6, 7, 8 and 9 are partial cross sections showing, as examples, various channel root profiles.
Figure 7:
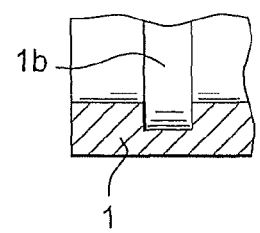
Figure 8:
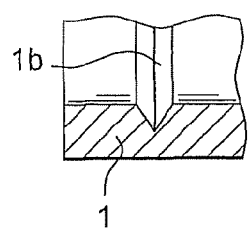
Figure 9:
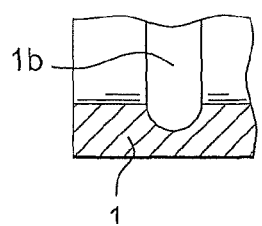

The profile of the channels may have various shapes, particularly square (FIG. 6), rectangular (FIG. 7), triangular (FIG. 8), round (FIG. 9), being bevelled or not.

In view of the problem to be solved, to prevent the grease from leaving the friction surface, the channels (1b) and (1c) are positioned at a distance from each of the ends (1a1) and (1a2) of the bore, between 1 and about 6 mm. Similarly, the width of the channels (1b) and (1c) is between 0.5 and about 5 mm.

In view of the combination of channels (1b) and (1c) and grooves (1d), it results that the said channels in communication with the said grooves serve to prevent the removal of the grease present in the zone bounded by the said grooves (1d), the channels also acting as a grease reserve to resupply these grooves.

The depth of the channels (1*b*) and (1*c*) is about 1 to 10 times higher than the depth of the grooves (1*d*). The grooves (1*d*) bound a zone (chevrons or grid, for example) representing about 30 to 70% of the friction zone.

As indicated, these joint assemblies have a particularly advantageous application in the railway field for all types of joints, particularly disk brake or block brake linkages, with only one lubrication upon assembly, and more specially for any type of joint operating in oily conditions.

The advantages clearly appear from the description, particularly with reference to the comparative tests which show that, according to the invention, after travelling 1,300,000 kilometers, the bogie brake linkage system displays no jamming or corrosion, whereas according to the prior art, after 800,000 kilometers, jamming and corrosion appear.

The invention claimed is:

1. A greased joint assembly operating in oily conditions, the assembly being lubricated with grease only at time of assembling the assembly and comprising:
    an axle mounted rotating or pivoting in a ring of a bogie brake linkage,
    wherein at least one of the axle and the ring are subjected to a hardening surface treatment by diffusion or structural transformation, followed by a finishing surface treatment of oxidation or phosphatation reaction, followed by a treatment that reduces jamming and corrosion in at least one of the axle and the ring, at least one of a bore of the ring and the axle having arrangements acting as a self-contained grease reserve.

2. Assembly according to claim 1, wherein the arrangements for acting as a grease reserve comprise holes or cavities.

3. Assembly according to claim 1, wherein the arrangements for acting as a grease reserve comprise grooves.

4. Assembly according to claim 3, wherein the grooves form a grid.

5. Assembly according to claim 3, wherein the grooves form chevrons.

6. Assembly according to claim 1, wherein the arrangements acting as a grease reserve are placed between respective channels formed at each end of the bore of the ring.

7. Assembly according to claim 6, wherein the arrangements comprise grooves communicating with the channels.

8. Assembly according to claim 7, wherein the grooves communicating with the channels prevent removal of grease present in a zone bounded by the grooves.

9. Assembly according to claim 8, wherein the channels act as a grease reserve resupplying grease to the grooves.

10. Assembly according to claim 9, wherein the channels have a depth greater than a depth of the grooves.

11. Method of providing a greased joint assembly lubricated with grease only at time of assembling the assembly, comprising:
    mounting an axle rotatably or pivotably in a ring;
    subjecting at least one of the axle and the ring to a hardening surface treatment by diffusion or structural transformation, followed by a finishing surface treatment of oxidation or phosphatation reaction, followed by a treatment that reduces jamming and corrosion in at least one of the axle or the ring; and
    providing at least one of a bore of the ring and the axle with arrangements acting as a self-contained grease reserve.

12. The method according to claim 11, wherein the treatment that reduces jamming and corrosion comprises at least one of applying a coat of polymer and oil impregnation.

13. The method according to claim 12, wherein the polymer contains a solid lubricant.

14. The method according to claim 13, wherein the solid lubricant comprises at least one of graphite, molybdenum, bisulphide and PTFE.

15. The method according to claim 11, further comprising applying the greased joint assembly to a transport system.

16. The method according to claim 15, wherein the transport system comprises a railway.

17. The method according to claim 16, wherein said applying comprises applying the greased joint assembly to a brake linkage for railway rolling stock.

\* \* \* \* \*